United States Patent [19]

Moore et al.

[11] Patent Number: 4,660,171

[45] Date of Patent: Apr. 21, 1987

[54] APPARATUS AND METHOD USING A PROGRAMMABLE LOGIC ARRAY FOR DECODING AN OPERATION CODE AND PROVIDING A PLURALITY OF SEQUENTIAL OUTPUT STATES

[75] Inventors: Victor S. Moore, Pompano Beach; Wayne R. Kraft, Coral Springs; Joseph C. Rhodes, Jr., Boca Raton, all of Fla.

[73] Assignee: International Business Machines Corp., Armonk, N.Y.

[21] Appl. No.: 332,585

[22] Filed: Dec. 21, 1981

[51] Int. Cl.[4] .................. H03K 19/20; H03K 13/00
[52] U.S. Cl. .................................. 364/900; 364/716; 307/463; 340/825.83
[58] Field of Search ... 364/200 MS File, 900 MS File, 364/716; 307/465, 463, 518; 340/825.83, 825.85, 825.86, 825.87

[56] References Cited

U.S. PATENT DOCUMENTS

| | | | |
|---|---|---|---|
| 3,974,366 | 8/1976 | Hebenstreit | 235/152 |
| 4,195,352 | 3/1980 | Tu et al. | 364/900 |
| 4,336,601 | 6/1982 | Tanaka | 364/900 |
| 4,354,228 | 10/1982 | Moore et al. | 364/200 |
| 4,488,246 | 12/1984 | Brice | 364/900 |
| 4,495,590 | 1/1985 | Mitchell, Jr. | 364/716 |

OTHER PUBLICATIONS

N. F. Brickman et al., "Programmable Logic Array Logic Enhancement," IBM Technical Disclosure Bulletin, vol. 19, No. 2, Jul. 1976, p. 583.
S. B. Greenspan, "Multiple Partitioned Programmable Logic Array", IBM Technical Disclosure Bulletin, vol. 19, No. 5, Oct. 1976, pp. 1780-1781.
Whitley, L. D., "PLA Having OR-Array Bit Partitioning," IBM Technical Disclosure Bulletin, vol. 24, No. 6, Nov. 1981, pp. 2747-2748.
"Current Switch Read-Only Programmable Logic Array", IBM Technical Disclosure Bulletin, vol. 18, No. 10, Mar. 1976, Cavaliere et al.

*Primary Examiner*—Gareth D. Shaw
*Assistant Examiner*—Jonathan C. Fairbanks
*Attorney, Agent, or Firm*—Shelley Beckstrand; Richard E. Bee

[57] ABSTRACT

Apparatus and method for decoding computer operation codes. The operation code is decoded into a single product term in the AND array of a programmable logic array. That single product term is then processed through a clock driven sequencer to generate a plurality of sequential product terms. These sequential product terms are decoded by the OR array of the programmable logic array to generate a plurality of sequential time states comprising the decoded operation code.

3 Claims, 2 Drawing Figures

APPARATUS AND METHOD USING A PROGRAMMABLE LOGIC ARRAY FOR DECODING AN OPERATION CODE AND PROVIDING A PLURALITY OF SEQUENTIAL OUTPUT STATES

TECHNICAL FIELD

Our invention relates to an improvement in a programmable logic array (PLA) configuration used for decoding computer operation codes to provide a plurality of sequenced outputs for controlling the operation of the computer.

BACKGROUND ART

The prior art patent application Ser. No. 105,711, filed Dec. 20, 1979, now U.S. Pat. No. 4,354,228, by W. R. Kraft, et al, for "A Flexible Processor On A Single Semiconductor Substrate" of common assignee, the teachings of which are incorporated herein by reference, provides for the decoding of computer operation codes (OP codes) using a programmable logic array (PLA). (See page 11 of Kraft, et al.) A PLA typically includes an AND array and an OR array. Decoding of an OP code is done by applying the OP code to the AND array of the PLA, and by extracting the proper control information from the OR array of the PLA. When a sequence of control information is required for a given OP code, a clock signal is applied along with the OP code to the AND array, and a unique product line is provided in the AND array for each unique instruction time state resulting from each unique combination of OP code and clock signal (see page 5, lines 28-35, and page 15, lines 19-30 of Kraft, et al, supra). Because one instruction may have many such time states, and because there may be many instructions, a PLA is typically very large and slow for many applications.

SUMMARY OF THE INVENTION

In accordance with the present invention, we provide an apparatus and method for decoding an operation code to provide a plurality of time states where the operation code forms an input to the AND array of a programmable logic array. For each operation code, there is a unique output from the AND array. For each operation code which requires a plurality of time states, the product term output from the AND array is input to a clock driven sequencer, the outputs of which form unique sequenced product terms for each time state and are fed into an OR array.

An advantage of our decoding apparatus and method is that once the operation code has been decoded into an initial output from the AND array, all output sequences from the OR array are established without having to execute another pass through the AND array. This results in a smaller AND array and faster PLA than is possible with the prior art.

BRIEF DESCRIPTION OF THE DRAWINGS

The details of our invention will be described in connection with the accompanying drawings, in which FIG. 1 is a schematic drawing illustrating the apparatus of our invention; and in which

DESCRIPTION OF THE PREFERRED EMBODIMENT

Figure 1:
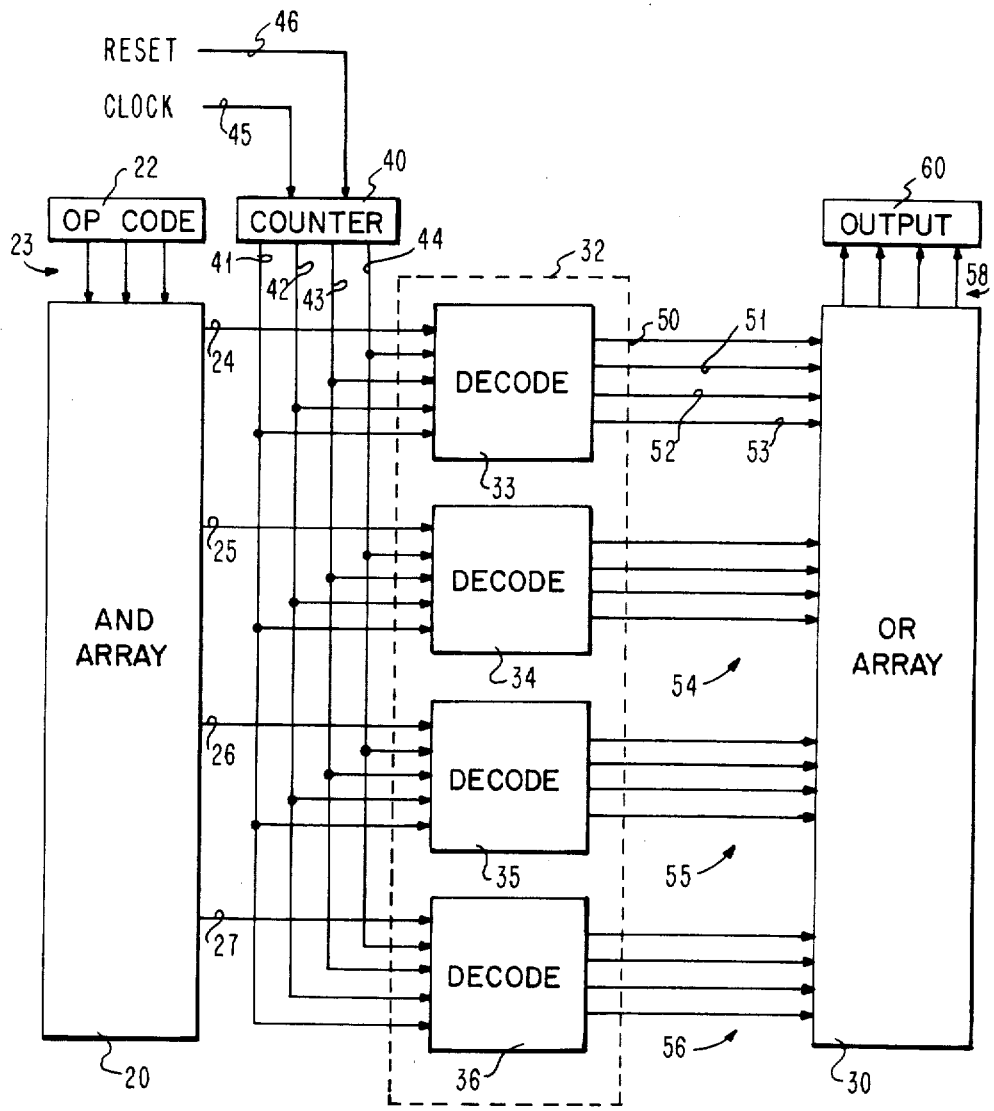

Referring to FIG. 1, a decoding apparatus constructed in accordance with our invention includes a programmable logic array having an AND array 20 and an OR array 30. Input to AND array 20 is a multi-bit operation code 22 on lines 23, and the output of AND array 20 is one of product term lines 24-27, with one of product term lines 24-27 corresponding to each possible valid operation code input on lines 23.

Each of AND array 20 product term lines 24-27 (corresponding to an operation code which is to be decoded into a plurality of time states) is fed to sequencer circuits 32, including one of N binary decode circuits 33-36. Also input to sequencer circuits 32 are counter 40 signals 41-44 from counter 40, which is driven by clock signals on line 45 and reset by line 46 with each new OP code loaded into register or bus 22. Binary decode circuit 33 is responsive to an AND array output product term signal on line 24 to generate sequential product term signals on lines 50-53 under control of clock 45. These are input sequentially to OR array 30, which provides decoded sequential output signals 60 on lines or bus 58 corresponding to AND array inputs 22.

Similarly, binary decoders 34-36 are responsive to AND array product term outputs 25-27 to generate sequential product line signals 54-56, and these are processed by OR array 30 to provide decoded sequential output signals on lines 58.

While four binary decode circuits 33-36 are shown, this is intended to be merely illustrative, as is the number of product terms 24-27, counter 40 output signals 41-44, sequential product terms 50-56, and OR array outputs 58. A typical configuration would necessarily include many more such circuits, signals, and terms according to the requirements of the computing apparatus being controlled.

Figure 2:
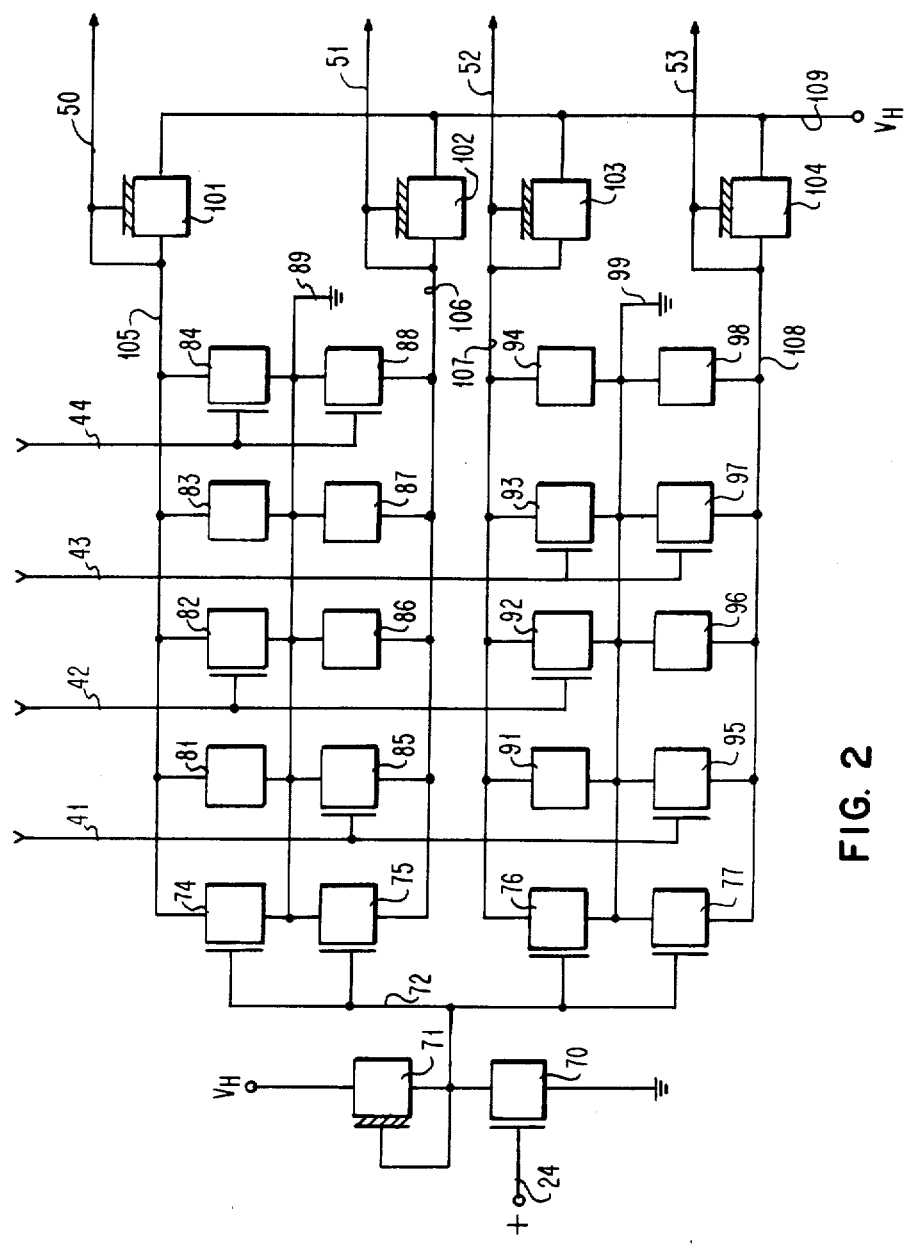
FIG. 2 is a detailed schematic diagram illustrating one decode circuit from the sequencer circuit in FIG. 1.

Referring now to FIG. 2, an explanation will be given of an illustrative embodiment for binary decoder 33, it being understood that binary decoders 34-36 may be similar in design. For purposes of illustration, the inputs to decoder include product term 24 from AND array 20, and counter output lines 41-44; and the outputs are sequential product terms 50-53. In Table 1 we set forth the specific illustrative relationship established between the inputs and outputs, where lines 41 and 43 represent bits 0 and 1, respectively, of a two-bit counter 40; and lines 42 and 44 represent not bit 0 and not bit 1, respectively, of two-bit counter 40. A two-bit counter 40 is capable of generating four sequential product terms from each binary decoder 33-36. If more terms are required, the counter need be merely enlarged accordingly.

TABLE 1

| Binary Decoder 33 | |
|---|---|
| Input (Lines 41, 43) | Active Output Line |
| 00 | 50 |
| 10 | 51 |
| 01 | 52 |
| 11 | 53 |

Binary decode circuit 33 includes field effect transistors (FET) 70, 71 arranged and coupled to invert a product term signal on line 24 applied to the gate of FET 70, and establish a drive current and voltage on line 72 to the gates of select column FET's 74–77. The source terminals of select FET's 74–75 and decode array FET's 81–88 are connected by line 89 to ground, and those of select FET's 76, 77 and decode array FET's 91–98 by line 99. The drain terminals of FET's 74, 81–84 are connected to the source input of depletion gate 101 by line 105, those of FET's 75, 85–88 to the source input of depletion gate 102 by line 106, those of FET's 76, 91–94 to the source input of depletion gate 103 by line 107, and those of FET's 77, 95–98 to the source input of depletion gate 104 by line 108. The drains of FET's 101–104 are connected to voltage source $V_H$ by line 109. With the source and gate of each FET 101–104 tied together as shown, FET's 101–104 act as pull up resistors or load devices for driving OR array 30 over sequenced product term lines 50–53 respectively.

Counter 40 bit 0 line 41 is connected to the gates of FET's 85 and 95, not bit 0 line 42 to the gates of FET's 82 and 92, bit 1 line 43 to the gates of FET's 93, 97, and not bit 1 line 44 to the gates of FET's 84, 88.

In operation, with a positive voltage on product term line 24, for counter 40 output 00 (positive voltages on lines 42, 44), a sequenced product term signal is placed on line 50. Similarly, for counter 40 output of 10 (positive voltages on lines 41, 44), a sequenced product term signal is placed on line 51; for counter 40 output of 01, a signal is placed on line 52; and for counter 40 output of 11, a signal is placed on line 53.

While the device of FIG. 2 illustrates one manner of implementing decoder 33 (and 34–36), it will be apparent to those skilled in the art that other implementations are possible for generating a plurality of time sequential outputs 50–53 in response to an input signal 24. Further, it is not required that each of product term lines 24–27 generates an equal number of sequential product term lines 50–53, 54, 55, or 56; some OP codes 22 may decode to different numbers of unique execution time states. OP CODE register 22, and output register 60 may be implemented as registers, busses, or collections of signal lines.

While our invention has been described with respect to a preferred embodiment, the foregoing and other modifications thereto may be made without departing from the scope and intent thereof.

We claim:

1. Apparatus for decoding a selectable computer operation code, said apparatus including clock means for generating sequential timing signals, and a programmable logic array comprising an AND array to which a selected operation code is provided as an input and an OR array from which decoded output signals appear as sequential output signals, characterized by:

the AND array providing for each selectable operation code a corresponding unique output;

a plurality of sequencer means, one sequencer means for each unique output from the AND array, at least one sequencer means being coupled to said clock means and being responsive to said sequential timing signals produced by said clock means and to its corresponding unique output from said AND array for generating for the corresponding operation code a plurality of sequential time state signals comprising the input to said OR array; and said OR array being responsive to said sequential time state signals for generating a plurality of decoded sequential output signals representing a decoding of said corresponding operation code.

2. Apparatus for decoding a selectable computer operation code, comprising:

counter means for generating a plurality of sequential clock signals;

AND array means for generating for each selectable operation code a single unique product term;

a plurality of sequencer means, each sequencer means being responsive to said counter means for generating from a corresponding unique product term a plurality of sequenced product terms for a selected operation code; and OR array means responsive to said sequenced product terms for generating sequenced output signals representing a decoding of an operation code input to said AND array;

whereby a plurality of sequenced output signals may be generated out of said OR array means for one pass of a selected operation code through said AND array means.

3. The apparatus of claim 2 wherein said sequencer means includes a plurality of binary decoder means, with a decoder means provided for each unique product term, for generating unique sequenced product terms corresponding to each unique product term.

* * * * *